US009544902B1

(12) United States Patent
Narendran et al.

(10) Patent No.: US 9,544,902 B1
(45) Date of Patent: Jan. 10, 2017

(54) METHODS, SYSTEMS, AND COMPUTER READABLE MEDIA FOR SELECTING WIRELESS CHANNEL BANDWIDTH BASED ON DATA-USAGE TENDENCY OF USER EQUIPMENT

(71) Applicant: Sprint Spectrum L.P., Overland Park, KS (US)

(72) Inventors: Rajveen Narendran, Olathe, KS (US); Sreekar Marupaduga, Overland Park, KS (US); Nicholas D. C. Kullman, Kansas City, MO (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 105 days.

(21) Appl. No.: 13/855,464

(22) Filed: Apr. 2, 2013

(51) Int. Cl.
*H04W 72/04* (2009.01)
*H04W 72/12* (2009.01)
*H04L 12/54* (2013.01)

(52) U.S. Cl.
CPC .......... *H04W 72/048* (2013.01); *H04W 72/04* (2013.01); *H04W 72/0486* (2013.01); *H04L 12/5695* (2013.01); *H04W 72/044* (2013.01); *H04W 72/0453* (2013.01); *H04W 72/0493* (2013.01); *H04W 72/1205* (2013.01)

(58) Field of Classification Search
None
See application file for complete search history.

(56) References Cited

U.S. PATENT DOCUMENTS

| | | | |
|---|---|---|---|
| 7,116,682 B1 * | 10/2006 | Waclawsky | H04J 3/1682 370/468 |
| 7,889,761 B2 | 2/2011 | Frank et al. | |
| 8,185,127 B1 * | 5/2012 | Cai et al. | 455/452.2 |
| 2004/0248583 A1 * | 12/2004 | Satt et al. | 455/452.2 |
| 2005/0052992 A1 * | 3/2005 | Cloonan et al. | 370/229 |
| 2008/0025255 A1 * | 1/2008 | Garg et al. | 370/329 |
| 2009/0010274 A1 * | 1/2009 | Koskan | 370/437 |
| 2010/0015926 A1 * | 1/2010 | Luff | 455/67.13 |

(Continued)

OTHER PUBLICATIONS

Ghosh, Arunabha et al.; Fundamentals of LTE, table of contents, pp. 7-9, 20-35, 227-232, 246-248, and 289-290 (40 pages), Aug. 2010.

(Continued)

*Primary Examiner* — Olumide T Ajibade Akonai
*Assistant Examiner* — Margaret G Mastrodonato

(57) ABSTRACT

Systems, computer-readable media, and methods for selecting channel bandwidths to a user equipment (UE) device for carrying out a communication session. Selection of the channel bandwidth can be based on a data-usage tendency of the UE device. The data-usage tendency can indicate a data-usage rate of the UE device or a set of user equipment devices similar to the UE device. The channel bandwidth can comprise a plurality of subcarriers. Two or more of the subcarriers can be adjacent to one another or be separated by one or more subcarriers of a channel bandwidth assigned or assignable to another UE device for another communication session. A processor that selects the channel bandwidth can further base its selection on a service plan associated with the UE device and load conditions of frequency bands of a radio access network.

22 Claims, 6 Drawing Sheets

(56) References Cited

U.S. PATENT DOCUMENTS

| | | | |
|---|---|---|---|
| 2013/0084847 A1 | 4/2013 | Tibbitts et al. | |
| 2014/0004815 A1* | 1/2014 | Shaw | 455/405 |
| 2014/0056154 A1* | 2/2014 | Agarwal et al. | 370/252 |
| 2014/0357285 A1* | 12/2014 | Smith | H04W 48/17 455/450 |
| 2014/0357289 A1* | 12/2014 | Smith | H04W 16/14 455/452.2 |

OTHER PUBLICATIONS

Myung, Hyung G., Single Carrier FDMA, 64 pages, May 18, 2008.
Anritsu Company, LTE Resource Guide, pp. 1-18, 2009.
Wired N Wireless, LTE: Physical Layer, pp. 1-8, Sep. 14, 2009.
Bhandare, Tejas, LTE and WiMAX Comparison, Santa Clara University, 59 pages, Dec. 2008.
Alcatel-Lucent, The LTE Network Architecture, a comprehensive tutorial, strategic white paper, 26 pages, Dec. 2, 2009.
LG Space, Channel bandwidths per operating band (36.101), downloaded from the World Wide Web at http://niviuk.free.fr/lte_bandwidth.php on Feb. 28, 2013, 5 pages.
Brome, Rich, Tri-Band LTE Phones Coming to Sprint in Late 2013, 2 pages, Jan. 8, 2013.
Poole, Ian; Radio-Electronics.com, LTE Frequency Bands & Spectrum Allocations, downloaded from the World Wide Web at http://www.radio-electronics.com/info/cellulartelecomms/lte-long-term-evolution/lte-frequency-spectrum.php on Feb. 28, 2013, 6 pages.
3RD Generation Partnership Project, Technical Specification Group Radio Access Network; Evolved universal terrestrial radio access (E-UTRA) and Evolved universal terrestrial radio access network (E-UTRAN); Overall Description, Stage 2 (Release 8); 3GPP TS 36.300 V8.3.0, Dec. 2007, 120 pages.
Celluar Frequencies, downloaded from the World Wide Web at http://en/wikipedia.org/wiki/Cellular_frequencies on Mar. 20, 2013, 6 pages.
3RD Generation Partnership Project, Technical Specification Group Radio Access Network; Evolved universal terrestrial radio access (E-UTRA); Base station (BS) radio transmission and reception (Release 8); 3GPP TS 36.104 V8.0.0, Dec. 2007, 47 pages.
European Telecommunications Standards Institute (ETSI); LTE; Evolved Universal Terrestrial Radio Access Network (E-UTRAN); Architecture description (3GPP TS 36.401 version 8.6.0 Release 8) Jul. 2009, 21 pages.

* cited by examiner

METHODS, SYSTEMS, AND COMPUTER READABLE MEDIA FOR SELECTING WIRELESS CHANNEL BANDWIDTH BASED ON DATA-USAGE TENDENCY OF USER EQUIPMENT

BACKGROUND

Unless otherwise indicated herein, the elements described in this section are not prior art to the claims and are not admitted to be prior art by inclusion in this section.

User equipment (UE) devices, such as cell phones, are operable to communicate with radio access networks, such as cellular wireless networks. These UE devices and access networks typically communicate with each other over a radio frequency (RF) air interface according to a wireless protocol such as 1× Evolution Data Optimized (1×Ev-DO), perhaps in conformance with one or more industry specifications such as IS-856, Revision 0, IS-856, Revision A, and IS-856, Revision B. Other wireless protocols can be used as well, such as Code Division Multiple Access (CDMA), Global System for Mobile Communications (GSM), Time Division Multiple Access (TDMA), or some other wireless protocol.

Randomly assigning RF resources of a radio access network air interface to a UE device may not provide the radio access network with sufficient flexibility to use the RF resources efficiently. Assigning RF resources in a manner that provides for more efficient use of RF resources may increase user satisfaction of users of user equipment using the RF resources.

OVERVIEW

This application describes several example embodiments, at least some of which pertain to selecting an RF channel bandwidth based on a data-usage tendency of a user equipment device operable to engage in a communication session using RF resources defined for the selected channel bandwidth. Selecting the channel bandwidth can further be based on other factors including, but not limited to, a load condition of a radio access network and a service plan associated with the user equipment device.

In one respect, an example embodiment can take the form of a method comprising (i) receiving, using a radio access network (RAN) device, a request to use a RAN to carry out a communication session between a user equipment (UE) device and at least one other device, (ii) determining, using the RAN device, a data-usage tendency of the UE device, (iii) selecting, using the RAN device, a channel bandwidth based on the determined data-usage tendency of the UE device, and (iv) assigning, using the RAN device, the selected channel bandwidth to the UE device for carrying out the communication session.

In another respect, an example embodiment can take the form of a system comprising (i) a computer-readable data storage device, and (ii) a processor configured to receive a request to use a RAN to carry out a communication session between a UE device and at least one other device, and configured to execute computer-readable program instructions stored at the computer-readable data storage device, wherein the computer-readable program instructions comprise program instructions executable to determine a data-usage tendency of the UE device, program instructions executable to select a channel bandwidth based on the determined data-usage tendency of the UE device, and program instructions executable to assign the selected channel bandwidth to the UE device for carrying out the communication session.

In yet another respect, an example embodiment can take the form of a non-transitory computer-readable data storage device comprising program instructions executable by a processor to cause performance of the following operations: (i) receiving a request to use a RAN to carry out a communication session between a UE device and at least one other device, (ii) determining a data-usage tendency of the UE device, (iii) selecting a channel bandwidth based on the determined data-usage tendency of the UE device, and (iv) assigning the selected channel bandwidth to the UE device for carrying out the communication session.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which.

DETAILED DESCRIPTION

I. Introduction

As mentioned above, this application describes several example embodiments. Within this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. The ordinal numbers can be written in the form of $1^{st}$, $2^{nd}$, $3^{rd}$, and so on.

The diagrams and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (for example, machines, interfaces, functions, orders, or groupings of functions or operations) can be used instead. Furthermore, various functions or operations described as being performed by one or more elements can be carried out by a processor executing computer-readable program instructions or by any combination of hardware, firmware, or software.

II. Example System Architecture

Figure 1:
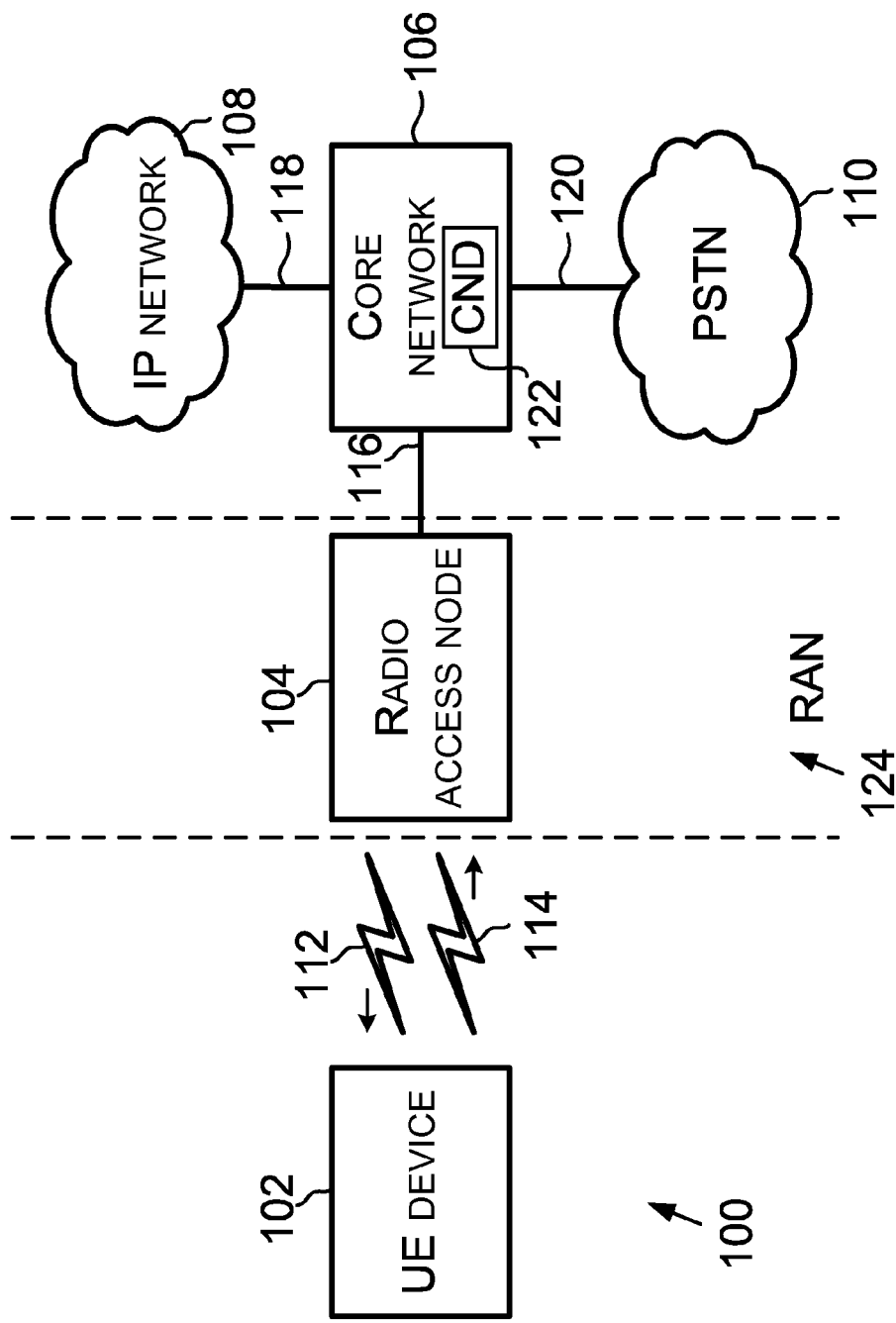
FIG. 1 is a block diagram of an example wireless telecommunication system in accordance with one or more example embodiments described herein.

FIG. 1 is a block diagram of a wireless telecommunication system 100 in accordance with one or more example embodiments. System 100 includes a user equipment (UE) device 102 (or more simply, UE device 102), a radio access network 124 including a radio access node 104, a core network 106, an Internet Protocol (IP) network 108, a public switched telephone network (PSTN) 110, a forward-link air interface 112, a reverse-link air interface 114, a backhaul network link 116, an IP-core-networks link 118, and a PSTN-core-networks link 120.

Radio access node 104 is a RAN device. One or more other UE devices, configured like UE device 102 or otherwise, can operate within system 100 to carry out wireless communications using RAN 124, or another RAN (not shown) that is configured for operation within system 100. The other RAN can comprise a RAN device, like radio access node 104 or otherwise, that is communicatively coupled to core network 106.

Figure 2:
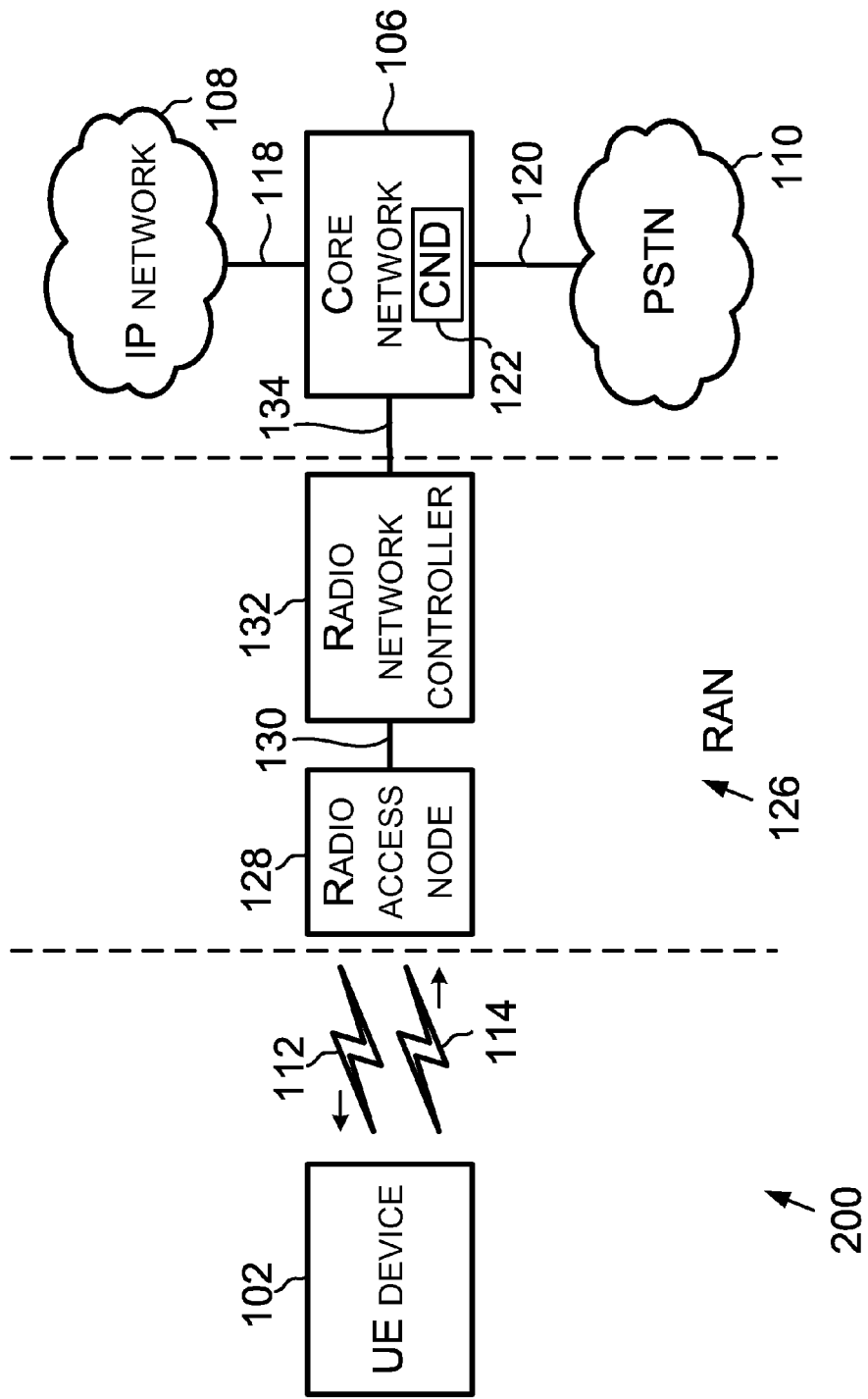
FIG. 2 is a block diagram of another example wireless telecommunication system in accordance with one or more example embodiments described herein.

FIG. 2 is a block diagram of a wireless telecommunication system 200 in accordance with one or more example embodiments. System 200 includes UE device 102, a radio access network (RAN) 126 including a radio access node 128 and a radio network controller 132, each of which can be linked together via a radio-access-node-to-radio-network-controller link 130, core network 106, IP network 108, PSTN 110, forward-link air interface 112, reverse-link air interface 114, a backhaul network link 134, IP-core-networks link 118, and a PSTN-core-networks link 120. Radio access node 128 and radio network controller 132 are both RAN devices. One or more other UE devices, configured like UE device 102 or otherwise, can operate within system 200 to carry out wireless communications using RAN 126, or another RAN (not shown) that is configured for operation within system 200. The other RAN can comprise a RAN device like radio access node 104 or radio network controller 132 that is communicatively coupled to core network 106.

The following description describes components shown in FIG. 1, FIG. 2, or both. The components having similar numbers in those figures are described as being identical components. A person having ordinary skill in the art will understand that the components having similar numbers in those figures can be arranged in different configurations.

Core network 106 includes a core network device (CND) 122 and can include one or more other core network devices (not shown). IP network 108 can comprise at least a portion of the Internet. PSTN 110 can include at least a portion of the telephone network including land line telephones. IP network 108 and PSTN 110 can function as a respective transport network for CND 122 of core network 106. A device within or coupled to IP network 108 or PSTN 110 can request or participate in a communication session with UE device 102.

UE device 102 comprises a device that is configured to transmit radio frequency (RF) signals using reverse-link air interface 114 and to receive RF signals using forward-link air interface 112. UE device 102 can, for example, comprise a mobile device, such as (i) a mobile telephone or smartphone, such as a Galaxy S III smartphone manufactured by Samsung Electronics Co., Ltd. of Suwon, Korea, or (ii) a tablet computing device, such as an iPad with retina display manufactured by Apple Inc. of Cupertino, Calif. The device configured to transmit and receive RF signals can comprise a transceiver. The transceiver can, for example, be arranged as a single-input-single-output (SIMO) transceiver, a multiple-input-multiple-output (MIMO) transceiver, or some other transceiver. The transceiver can be configured for operating at one or more different frequency bands and one or more subcarriers within the one or more different frequency bands.

UE device 102 can operate according to one or more wireless communications standards or protocols. For example, UE device 102 can operate according to the $3^{rd}$ Generation Partnership Project (3GPP) standard, release 8, which is sometimes referred to as the long term evolution (LTE) standard. UE device 102 operating according to the LTE standard can, for example, be configured to use orthogonal frequency division multiple access (OFDMA) on forward-link air interface 112, and single-carrier frequency division multiple access (SC-FDMA) on reverse-link air interface 114. Using OFDMA can be referred to as orthogonal frequency division multiplexing (OFDM). As another example, UE device 102 can operate according the 3GPP standard, release 7 & 8, which is sometimes referred to as high speed packet access evolved (HSPA+). UE device 102 operating according to the HSPA+ standard can, for example, be configured to use code division multiple access (CDMA) or time division multiple access (TDMA) on both forward-link air interface 112 and reverse-link air interface 114. Other examples of the communication standards or protocols UE device 102 can use are also possible.

UE device 102 can also be configured to communicate with devices on IP network 108 or PSTN 110 using wired communication links without a radio access node, such as radio access node 104 or 128. In that configuration, UE device 102 can, for example, comprise a laptop computing device with an Ethernet card that connects to IP network 108 or PSTN 110 using the Ethernet card and a local area network. That example UE can include component(s) for interfacing with a RAN device of RAN 124 or RAN 126, such as a wireless air card (or more simply, an air card). The air card can include a transmitter to transmit data over reverse-link air interface 114 and a receiver to receive data transmitted over forward-link air interface 112. An air card can connect to a laptop computing device using a universal serial bus (USB) port, a type 2 PC card slot, an express card slot, or another port or slot of the laptop computing device. As an example, the air card can be arranged like a Merlin CC208 3G/$G 2-in-1 Card manufactured by Novatel Wireless, Inc. of San Diego, Calif. An air card can be referred to as a UE device and can be used on a UE device without the wired interface to IP network 108 or PSTN 110.

Radio access nodes 104 and 128 each comprise a node that is configured to transmit RF signals using forward-link air interface 112 and to receive RF signals using reverse-link air interface 114. Radio access node 104 and 128 can be configured to communicate with UE using one or more communication standards. Radio access node 104 is configured to communicate with core network 106 using backhaul network link 116. Radio access node 128 is configured to communicate with radio network controller 132 using radio-access-node-to-radio-network-controller link 130. Radio network controller 132, in turn, can communicate with core network 106 using backhaul network link 134.

In accordance with an embodiment in which a radio access node, such as radio access node 128, is configured to carry out communications in accordance with the 3G LTE release 8 standard, the radio access node can comprise or be configured as an enhanced Node-B, or more simply an eNodeB, that is configured to interface to a system architecture evolution gateway (SAE-GW) and a mobility management entity (MME) of core network 106. In accordance with that same embodiment, core network device 122 can be configured as the SAE-GW or MME. The eNodeB can be configured to perform functionality of both a base station and radio network controller 132.

In accordance with an embodiment in which a radio access node, such as radio access node 104, is configured to carry out communications in accordance with the 3G LTE release 7, the radio access node can comprise or be configured as a Node-B that includes radio network controller functionality and is configured to interface to a system architecture evolution gateway (SAE-GW) of core network 106. In accordance with that same embodiment, core network device 122 can be configured as the SAE-GW.

In accordance with an embodiment in which a radio access node, such as radio access node 104, is configured to carry out communications in accordance with the 3G/HSPA release 7, the radio access node can comprise or be configured as a Node-B without radio network controller functionality and is configured to interface to a radio network controller, which interfaces to a gateway GPRS service node (GGSN) of core network 106. In accordance with that same embodiment, CND 122 can be configured as the radio network controller, and another CND 122 can be configured as the GGSN. Other example arrangements of radio access node 104 and 128 are also possible.

RAN 124, RAN 126, or both can provide one radio frequency band within the coverage area(s) provided by those RAN(s). Alternatively, RAN 124, RAN 126, or both can provide multiple radio frequency bands with the coverage area(s) provided by those RAN(s). Table 1 below identifies example radio frequency bands. Other examples of the radio frequency or frequencies provided by RAN 124, RAN 126, or both are also possible. Each radio frequency band provided by RAN 124, RAN 126, or both can be configured to operate with one or multiple channel bandwidths. Table 1 below identifies example channel bandwidths. Other examples of the channel bandwidth(s) that RAN 124, RAN 126, or both can be configured to operate with are also possible.

Core network 106 is configured to carry out communications for users of UE devices, such as UE device 102. CND 122 can be configured as a home subscriber server to authenticate that UE device 102 is authorized for using other elements of system 100 or system 200. CND 122 can be configured as a gateway to permit UE device 102 or another core network device to access and interface to another network or another portion of core network 106. The gateway, for example, can comprise a packet data network (PDN) gateway, and SAE-GW, an MME, or a GGSN. Other examples of functions core network 106 performs and other examples core network devices are also possible.

Backhaul network 116, IP-core-networks link 118, PSTN-core-networks link 120, radio-access-node-to-radio-network-controller link 130, and backhaul network link 134 can be arranged in any of a variety of configurations for carrying bearer data and signal data between various elements connected to those network links. The bearer data comprises user data, such as voice data or World Wide Web browsing data. The signal data comprises control signals, such as signals identifying a telephone number being called. Backhaul network 116, IP-core-networks link 118, PSTN-core-networks link 120 radio-access-node-to-radio-network-controller link 130, and backhaul network link 134 can comprise wired or wireless links. Backhaul network 116, IP-core-networks link 118, PSTN-core-networks link 120 radio-access-node-to-radio-network-controller link 130, and backhaul network link 134 can comprise circuit-switched or packet-switched links.

Figure 3:
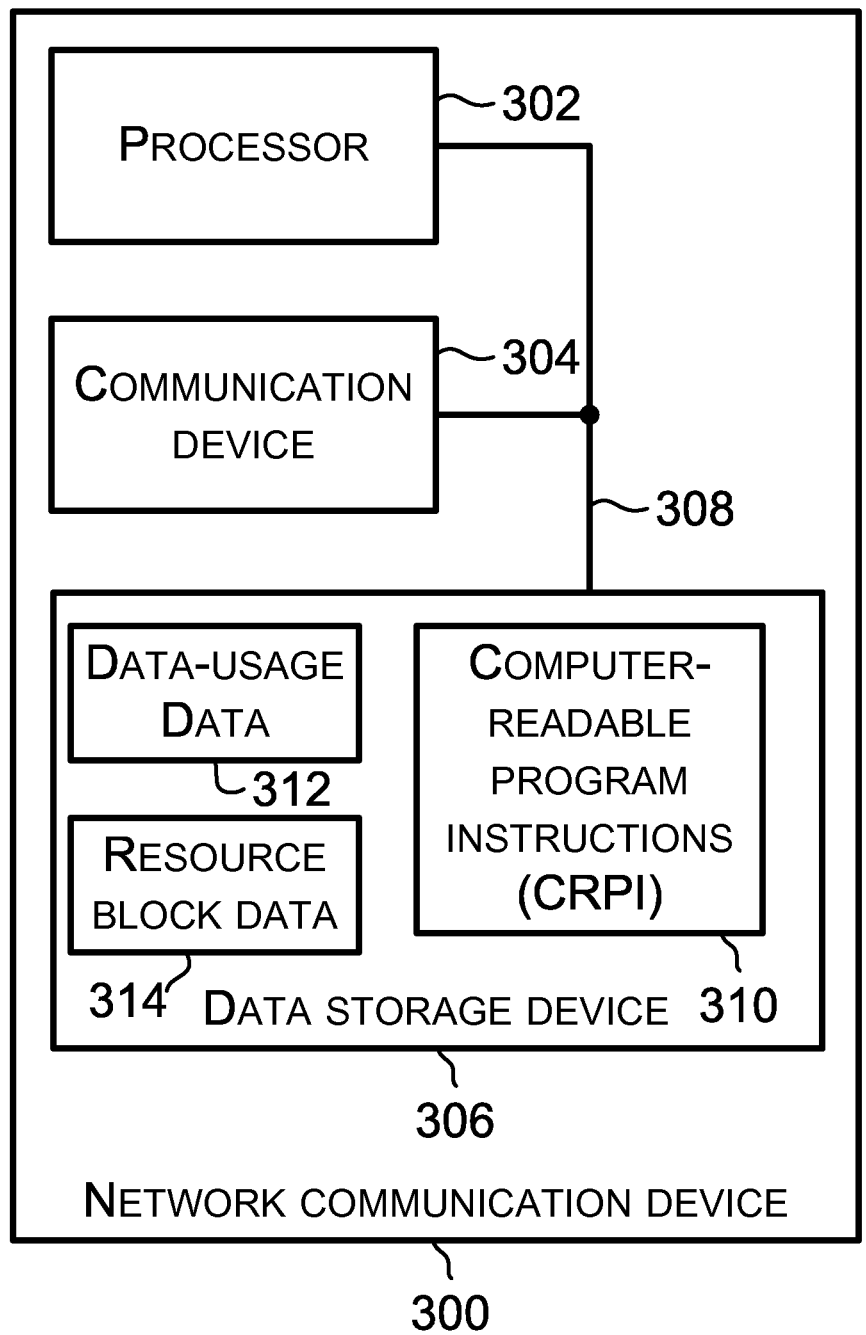
FIG. 3 is a block diagram of an example network communication device.

Next, FIG. 3 is a block diagram of an example network communication device 300 in accordance with one or more of the example embodiments. Network communication device 300 comprises a processor 302, a communication device 304, and a data storage device 306, all of which can be linked together via a system bus, network, or other connection mechanism 308. One or more devices within system 100 or system 200 can be configured like network communication device 300. For example, radio access node 104, CND 122, radio access node 128, or radio network controller 132 can be configured like network communication device 300. Examples of differences between radio access node 104, CND 122, radio access node 128, or radio network controller 132 being configured like network communication device 300 are described below.

Processor 302 can comprise one or more general purpose processors (for example, INTEL single core microprocessors or INTEL multicore microprocessors) or one or more special purpose processors (for example, application specific integrated circuits (ASICs) or digital signal processors (DSPs)). Processor 302 can execute computer-readable program instructions, such as computer-readable program instructions (CRPI) 310 stored in data storage device 306.

Processor 302 can receive data received by communication device 304, such as a request to carry out a communication session between UE device 102 and another device. Processor 302 can provide communication interface 304 with data to be transmitted by communication interface 304. Processor 302 can provide data storage device 306 with data to store at data storage device 306 and data to carry out a search of data storage device 306. Processor 302 can receive, from data storage device 306, data located during a search of data storage device 306.

Since radio access node 104 and radio access node 128 can be configured like network communication device 300, radio access node 104 and radio access node 128 can comprise a processor like processor 302. Similarly, since core network device 122 and radio network controller 132 can be configured like network communication device 300, core network device 122 and radio network controller 132 can comprise a processor like processor 302.

Communication device 304 can comprise a device (for example, one or more devices) that interfaces to at least one other element of system 100 or system 200. Interfacing to each of those element(s) can include transmitting and receiving bearer data and signaling to set up, carry out, and end communication sessions. Communication device 304 can receive a request to use RAN 124 or 126. Communication device 304 can provide processor 302 with a received request to use RAN 124 or 126.

Communication device 304 can comprise a transmitter (for example, one or more transmitters) to transmit and a receiver (for example, one or more receivers) to receive the bearer data and signaling. The transmitter and receiver can be separate or a combined transmitter and receiver in the form of a transceiver. Since radio access nodes 104 and 128 can be configured like network communication device 300, radio access nodes 104 and 128 can comprise a communication device like communication device 304. Similarly, since core network device 122 and radio network controller 132 can be configured like network communication device 300, core network device 122 and radio network controller 132 can comprise a communication device like communication device 304. A transmitter and receiver of communication device 304 that transmits RF signals can be referred to as a radio transmitter and radio receiver, respectively.

Communication device 304 can be configured to communicate with a UE device, such as UE device 102, using one or more channel bandwidths within two or more frequency bands. In accordance with one or more example embodiments, only one frequency band is used during a communication session. In accordance with one or more other example embodiments, two or more frequency bands are used during a communication session.

Data storage device 306 can comprise a non-transitory computer-readable storage medium readable by processor 302. The computer-readable storage medium can comprise volatile and/or non-volatile storage components, such as optical, magnetic, organic or other memory or disc storage, which can be integrated in whole or in part with processor 302. At least a portion of data storage device 306 can be a non-transitory machine readable medium separate from processor 302. Since radio access nodes 104 and 128 can be configured like network communication device 300, radio access nodes 104 and 128 can comprise a data storage device like data storage device 306. Similarly, since core network device 122 and radio network controller 132 can be configured like network communication device 300, core network device 122 can comprise a data storage device like data storage device 306.

CRPI 310 can comprise a variety of program instructions executable by processor 302. A person having ordinary skill in the art will understand that execution of program instructions of CRPI 310 can include executing some, but not all, of the program instructions of CRPI 310.

A person having ordinary skill in the art will also understand that program instructions of CRPI 310 can be stored within two or more separate portions of data storage device 306, such as a portion of data storage device 306 at radio access node 104 and a portion of data storage device 306 at CND 122. A processor at radio access node 104 can execute the program instructions stored within the data storage device at radio access node 104 and a processor at CND 122 can execute the program instructions stored within the data storage device at CND 122. Execution of the program instructions stored within a data storage device at radio access node 104 can cause occurrence of functions that trigger execution of the program instructions stored within a data storage device at CND 122. Similarly, execution of the program instructions stored within a data storage device at CND 122 can cause occurrence of functions that trigger execution of the program instructions stored within a data storage device at radio access node 104. Another example of the two or more separate portions of data storage device 306 include a portion of data storage device 306 at radio access node 128 and a portion of data storage device 306 at radio network controller 132.

CRPI 310 can comprise program instructions that cause processor 302 to provide data storage device 306 with data-usage data pertaining to UE device 102, and to cause data storage device 306 to store the provided data-usage data within data-usage device data 312. As an example, the data-usage data provided by processor 302 can include data-usage data pertaining to UE device 102 that processor 302 generates based on data transmitted to UE device 102 via forward-link air interface 112 or data UE device 102 transmits via reverse-link air interface 114. UE device 102 can provide processor 302 with data-usage data identifying quantities or data rates of data transmitted to UE device 102 via forward-link air interface 112 or data UE device 102 transmits via reverse-link air interface 114.

CRPI 310 can comprise program instructions that are executable by processor to provide data storage device 306 with and to cause data storage device 306 to store data-usage data associated with a particular type of UE device. As an example, the data-usage data can include data identifying the average data-usage rate for an air card manufactured by a manufacturer referred to as B (for example, Novatel Wireless, Inc.) in data-usage data 312 as 200 Megabytes per second (MB/s). CND 122 can provide that data usage data to communication device 304 for providing to processor 302.

CRPI 310 can comprise program instructions that are executable by processor 302 to determine a data-usage tendency of UE device 102. Those program instructions can cause processor 302 to search data-usage data 312 based on the type of user equipment of UE device 102 to determine the data-usage tendency. The data-usage tendency can, for example, be an average data rate used by the identified type of user equipment or the average data rate of UE device 102.

CRPI 310 can comprise program instructions that are executable by processor 302 to select a channel bandwidth based on the determined data-usage tendency of UE device 102.

CRPI 310 can comprise program instructions that are executable by processor 302 to assign the selected channel bandwidth to the UE device for carrying out the communication session. If the communication session is for two or more UE devices operating with a radio access node of RAN 124 or RAN 128, executing these program instructions can include selecting channel bandwidths for each of the two or more UE devices.

CRPI 310 can comprise program instructions that cause communication device 304 to transmit, for reception by UE device 102, a notification indicating the selected channel bandwidth assigned to UE device 102 for carrying out the communication session.

CRPI 310 can comprise program instructions that cause processor 302 to refer to data-usage data 312 to select a channel bandwidth, a frequency band, or both, to assign to UE device 102 for the communication session. Processor 302 may execute those program instructions after or in response to determining a user equipment type associated with UE device 102. Processor 302 can select and assign to UE device 102 a channel bandwidth, a frequency band or one or more subcarriers not currently being used by UE device 102.

Data-usage data 312 can comprise a variety of data. Data-usage data 312 can be stored in any of a variety of configurations, such as data within CRPI 310 or data within a database accessible by processor 302 executing CRPI 310.

Table 1 contains example data that can be stored as data-usage data 312. In particular, Table 1 includes numerical and text UE type identifiers associated with UE devices operable within systems 100 and 200, and for each UE type ID, a manufacturer (Mfg.) identifier representing an entity that manufactures UE devices, a data usage rating, an average data usage values, a channel bandwidth, and a frequency band. The data in each row is associated with the other data in that row. Upon determining the UE type ID of UE device 102, a data-usage tendency can be determined by processor 302 referring to the data-usage data (for example, a data usage rating or an average data usage value) associated with that UE type ID.

A channel bandwidth and frequency band can also be determined from data-usage data 312 for the identified UE type ID. As an example, the 2,500 MHz frequency band can be referred to as a first frequency band, the 1,900 MHz frequency band can be referred to as second frequency band, and the 800 MHz frequency band can be referred to as a third frequency band. Examples of other frequency bands, and examples of other frequency bands being referred to as the first, second, and third frequency bands are also possible.

TABLE 1

| UE Type ID | UE Type ID | Mfg. | Data Usage Rating | Ave. Data Usage | Channel Bandwidth | Frequency band |
|---|---|---|---|---|---|---|
| 01 | Air card | A | High | 300 MB/s | 20 MHz | 2,500 MHz |
| 02 | Air card | B | High | 200 MB/s | 20 MHz | 1,900 MHz |
| 03 | Tablet device | A | Medium | 25 MB/s | 15 MHz | 1,900 MHz |
| 04 | Tablet device | C | Medium | 15 MB/s | 10 MHz | 800 MHz |
| 05 | Smart phone | D | Low | 4 MB/s | 5.0 MHz | 1,900 MHz |
| 06 | Non-smart phone mobile phone | B | Very low | 100 KB/s | 1.4 MHz | 800 MHz |

Table 2 contains additional example data that can be stored as data-usage data 312. In particular, Table 2 includes UE identifiers associated with UE devices operable within systems 100 and 200, and for each of UE device identified by the UE identifiers, a maximum channel bandwidth, a UE type ID, an average data-usage, and a UE service plan. A RAN device can retrieve at least some data-usage data when authenticating that UE device 102 is allowed to use elements of RAN 124 or 126. That data can be retrieved from core network 106.

TABLE 2

| UE Identifier | Max Channel Bandwidth | UE Type ID | Ave. Data Usage | UE service plan |
|---|---|---|---|---|
| 122 555 4321 | 20 MHz | 01 | 100 MB/s | 1 |
| 312 001 9876 | 20 MHz | 02 | 100 MB/s | 1 |
| 246 555 0004 | 10 MHz | 04 | 20 MB/s | 3 |
| 218 465 1966 | 5 MHz | 05 | 2.5 MB/s | 4 |

A UE identifier can comprise a mobile identification number (MIN) associated with the UE device, an electronic serial number (ESN) associated with the UE device, a subscriber identity module (SIM) code from a SIM card installed within the UE device, or some other identifier.

The maximum channel bandwidth can identify the capacity of the UE device to carry out a communication session. A UE device can be configured to operate with any channel bandwidth that does not exceed the maximum channel bandwidth. The average data usage values in Table 2 can be usage values indicating the average data usage by a particular UE device or the average data usage by a plurality of UE devices. The plurality of UE devices may or may not include the UE device associated with that average data usage value. The average data usage values in Table 1, Table 2, or both can be or include data-usage tendency values that were determined prior to a request for establishing a particular communication session using the UE device 102.

The UE service plan is represented by a number in Table 2. UE devices having lower service plan numbers may be entitled to or provided with a greater quality of service as compared to UE devices having larger service plan numbers. A UE device user may pay a premium to associate his or her device with any service plan number than the greatest service plan number.

III. Example Operation

Figure 4:
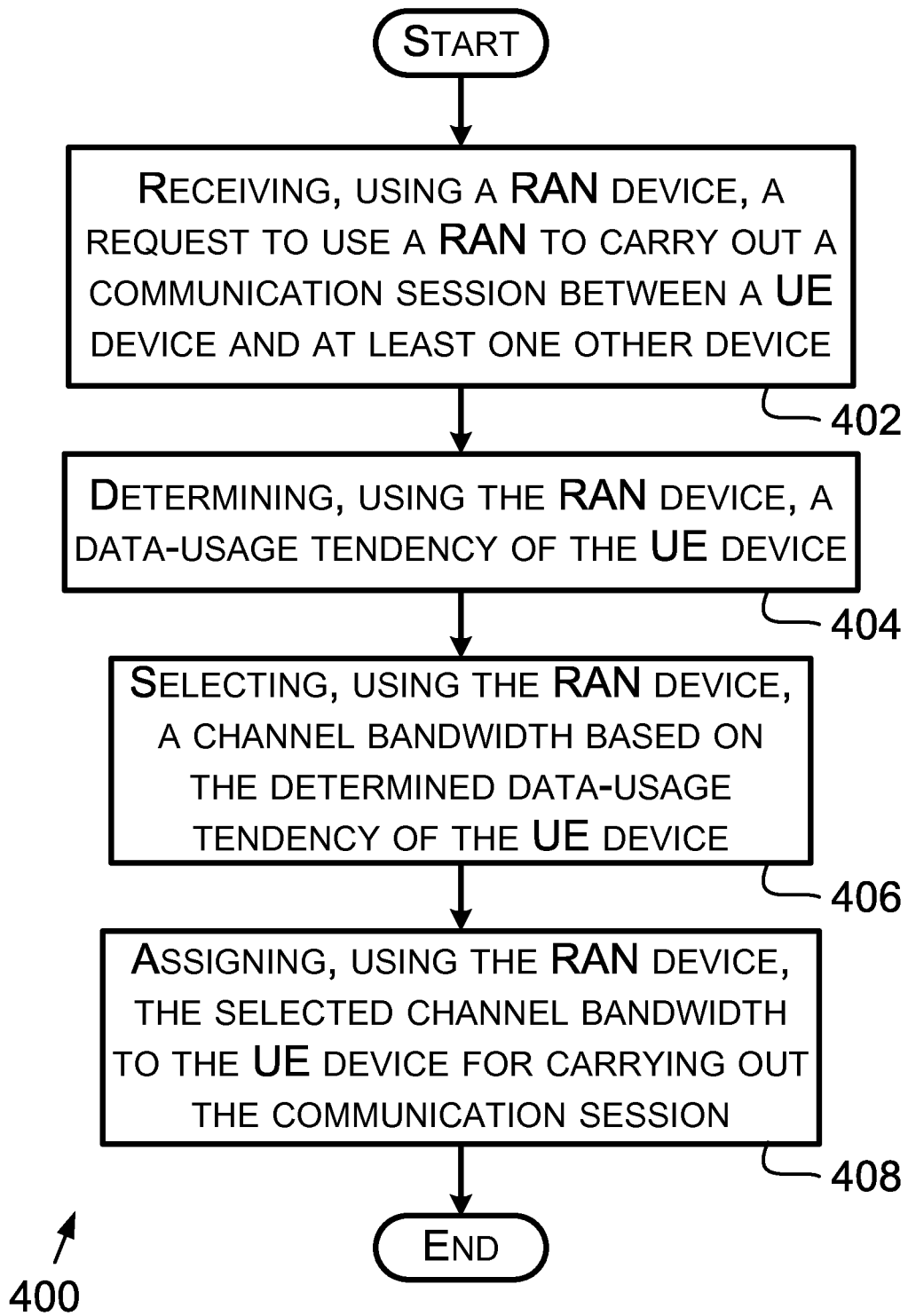
FIG. 4 is a flowchart depicting a set of functions that can be carried out in accordance with one or more example embodiments described herein.

FIG. 4 depicts a flowchart showing a set of functions 400 (or more simply, "the set 400") that can be carried out in accordance with one or more of the example embodiments described herein. The functions of the set 400 are shown within blocks labeled with even numbers between 402 and 408, inclusive. Other functions or operations described herein can be performed prior to, while, or after performing any one or more of the functions of the set 400. Those other functions or operations can be performed in combination with or separately from the any one or more of the functions of the set 400. One or more functions of the set 400 or described below can be carried out by processor 302 executing program instructions of CRPI 310 or in another manner.

Block 402 refers to a RAN, and blocks 402, 404, 406, and 408 refer to a RAN device. In one respect, the RAN can be arranged like RAN 124 and the RAN device can be arranged like radio access node 104. In another respect, the RAN can be arranged like RAN 126 and the RAN device can be arranged like radio access node 128. In yet another respect, the RAN can be arranged like RAN 126 and the RAN device can be arranged like radio network controller 132. In still yet another respect, the RAN can be arranged like RAN 126 and the RAN device can comprise a plurality of devices such as radio access node 128 and radio network controller 132. Other example arrangements of the RAN and RAN device referenced in blocks 402 through 408 are also possible.

Blocks 402, 404, 406, and 408 also refer to a UE device. The following description of blocks 402, 404, 406, and 408 refer to UE device 102 as an example of the UE device referenced in those blocks. The UE device referenced in blocks 402, 404, 406, and 408 could be arranged as a UE device different from UE device 102.

Block 402 includes receiving, using a RAN device, a request to use a RAN to carry out a communication session between a UE device and at least one other device. The communication session requested to be carried out can, for example, be a voice call, a data communication session, or a simultaneous voice and data communication session. The simultaneous voice and data communication session can, for example, include UE device 102 simultaneously receiving voice communications and a streaming video file. The requested communication session can change from a first type of communication session, such as a voice call, to a second type of communication session, such as a data communication session, during the communication session.

The request to use the RAN to carry out the communication session can be generated by any of a variety of devices. The device that generates the request can trigger or cause the request to be transmitted to the RAN device. As an example, the device that generates the request can comprise UE device 102. As another example, the device that generates the request can comprise a device of the at least one other device. Each device of the at least one other device can comprise another UE device operating in system 100 or 200, a device using IP network 108, a device using PSTN 110, or some other device. The request to use the RAN to carry out the communication session can therefore be received via a wireless communication link, such as reverse-link air interface 114, or via a wired communication link, such as backhaul network link 116 or 134.

Next, block 404 includes determining, using the RAN device, a data-usage tendency of the UE device. A processor, such as processor 302, can execute program instructions of CRPI 310 to determine the data-usage tendency of the UE device.

UE device 102 can be configured to transmit, to radio access node 104 or 128, data that indicates the data-usage tendency of UE device 102. Additionally or alternatively, UE device 102 can be configured to transmit, to radio access node 104 or 128, data that the RAN device can use to determine the data-usage tendency of UE device 102, such as a UE identifier, a maximum channel bandwidth, a UE type identifier, or a UE service plan identifier for the UE device 102.

Processor 302 can refer to and search data-usage data 312 to identify the data-usage tendency of the UE device based on the data a RAN device can use to determine the data-usage tendency. That data can include a UE Type identified and a manufacturer identified associated with the UE device.

Next, block 406 includes selecting, using the RAN device, a channel bandwidth based on the determined data-usage tendency of the UE device. A processor, such as processor 302, can execute program instructions of CRPI 310 to select the channel bandwidth based on the determined data-usage tendency of the UE device.

In one respect, the RAN device can select the channel bandwidth of a first radio frequency band for UE device 102 while UE device 102 is idling on a RF carrier or channel of the first radio frequency band. In another respect, the RAN device can select the channel bandwidth of a second radio frequency band for UE device 102 while UE device 102 is idling on a RF carrier or channel of the first radio frequency band.

The RAN device can determine the user equipment type of UE device 102 and refer to data-usage data 312 within data storage device 306 and select a channel bandwidth based on the user equipment type of UE device 102. The RAN device can determine the user equipment type of UE device 102 from data contained within the request the RAN device receives at block 402. That data, for example, can comprise one or more of the UE Type identifiers of Table 1 (for example, UE Type ID 02 and Air card).

Selecting the channel bandwidth can also be based on a load-condition of the selected channel bandwidth and a load condition of one or more other channel bandwidths assignable to UE device 102. For example, if the RAN device provides wireless communications using the first frequency band and the second frequency band and the assignable channels of the first frequency band are loaded above a threshold load amount for the first frequency band and the second frequency band is not loaded above a threshold load amount for the second frequency band, the RAN device can select a channel bandwidth of the second frequency band to the UE device for carrying out the communication session. The RAN device or another device, such as CND 122, can determine or store data indicating the loading conditions of the channel bandwidths and frequency band(s) of a radio access node assigning the channel bandwidths.

Selecting the channel bandwidth can also be based on a service plan associated with the UE device. For example, UE devices associated with service plans having the lowest service plan number (for example, a service plan for providing the highest quality of service) can be assigned channel bandwidths having wider bandwidths as compared to narrower channel bandwidths that are assigned to UE devices associated with a service plan associated with a larger service plan number.

Next block 408 includes assigning, using the RAN device, the selected channel bandwidth to the UE device for carrying out the communication session. Assigning the selected channel bandwidth to the UE device can be carried out in various manners. Examples of those various manners are described below. Two or more of those examples can be performed to carry out the communication session.

Assigning the selected channel bandwidth can include a processor, such as processor 302, executing program instructions of CRPI 310 to assign the selected channel bandwidth to the UE device.

Assigning the selected channel bandwidth can include assigning at least a portion of the selected channel bandwidth for forward-link communications from the RAN 124 or 126 to UE device 102 using forward-link air interface 112, assigning at least a portion of the selected channel bandwidth for reverse-link communications from UE device 102 to RAN 124 or 126 using reverse-link air interface 114, or assigning selected channel bandwidth for both forward-link and reverse-link communications.

Figure 5:
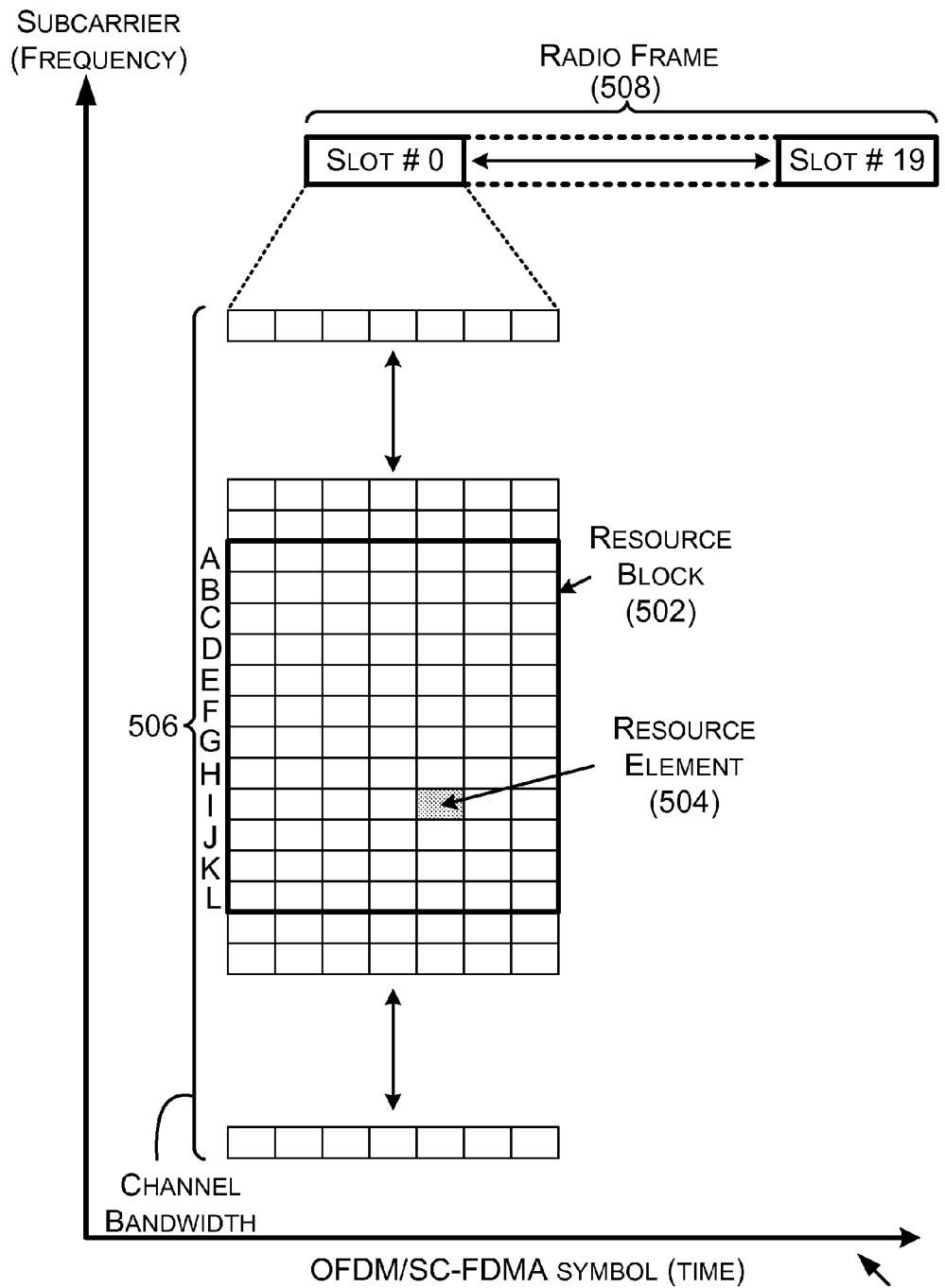
FIG. 5 is a diagram showing an example relationship between subcarrier frequencies and symbol times for communications using the OFDM/SC-FDMA protocols.
Figure 6:
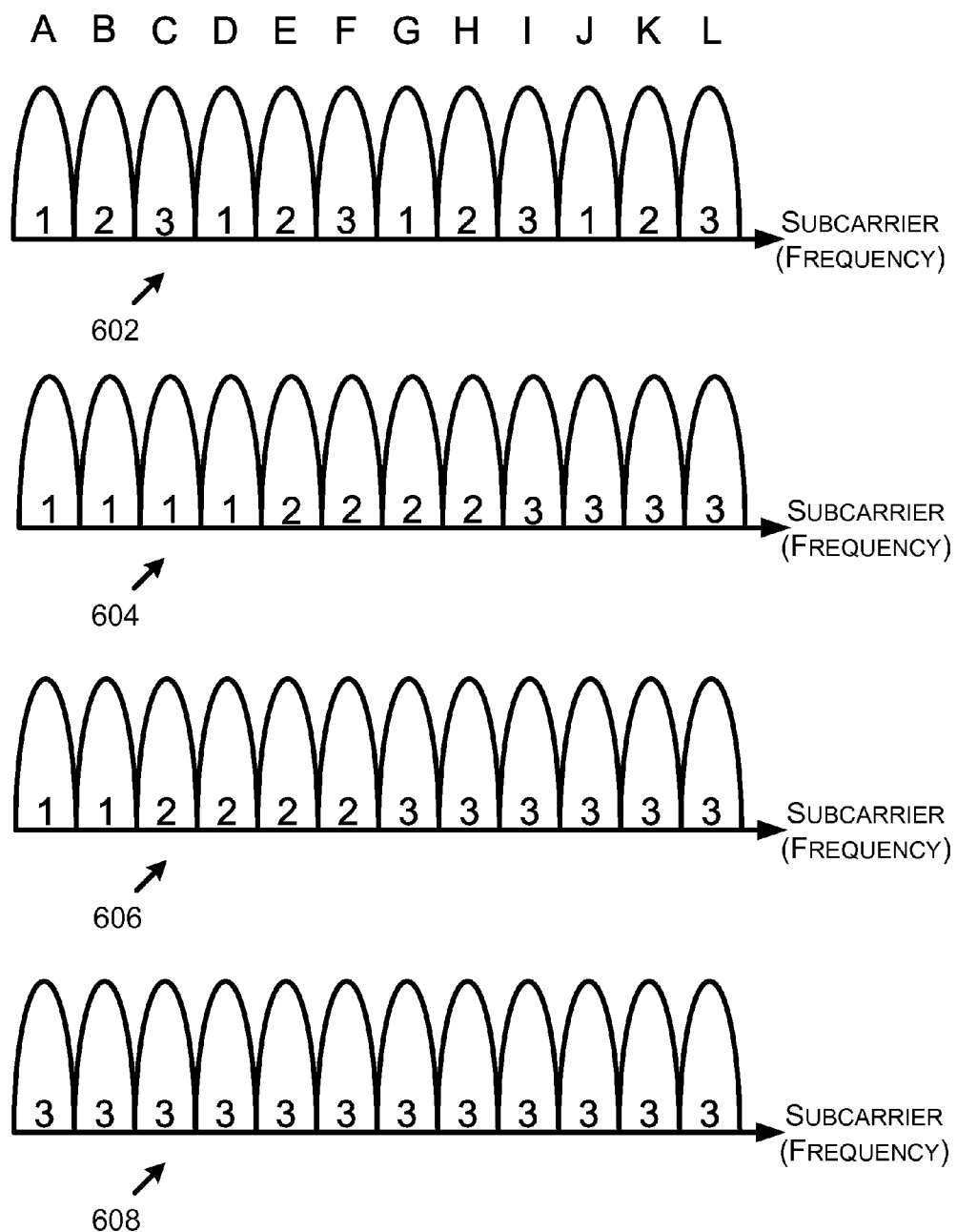
FIG. 6 shows subcarrier mapping diagrams.

Assigning the selected channel bandwidth can include assigning one or more subcarriers, resource blocks, or resource elements to use as the selected channel bandwidth. FIG. 5 and FIG. 6 illustrate details with respect to assigning one or more subcarriers, resource blocks, or resource elements to use as the selected channel bandwidth.

Assigning the selected channel bandwidth can include reserving one or more subcarriers, resource blocks, or resource elements to use as the selected channel bandwidth.

Assigning the selected channel bandwidth can include transmitting, to the UE device or another RAN device, a notification indicating that the one or more subcarriers, resource blocks, or resource elements are to be used as the selected channel bandwidth for carrying out the communication session. Communication device 304 can transmit that notification. UE device 102 can receive the notification indicating the one or more subcarriers, resource blocks, or resource elements are to be used as the selected channel bandwidth for carrying out the communication session and then use the one or more subcarriers, resource blocks, or resource elements assigned for the channel bandwidth to engage in the communication session.

IV. Example Channel Bandwidth Assignments

FIG. 5 is a diagram 500 showing an example relationship between subcarrier frequencies and symbol times for communications using the OFDM/SC-FDMA protocols. The diagram 500 illustrates example resources that can be assigned as the selected channel bandwidth. Those resources include a resource block 502 having 12 subcarriers labeled with letters A through L, inclusive. Within resource block 502, each subcarrier A through L includes a slot with 7 symbols or resource elements. Resource element 504 of subcarrier I is explicitly identified. Each slot of resource block 502 can be one of twenty slots of a respective radio frame, such as radio frame 508. The symbols carried via the radio frames can comprise encoded data, such as voice data, of the communication session. Other examples of the number of symbols within a slot, the number of slots within a radio frame, or the number of subcarriers in a resource block are also possible.

A channel bandwidth 506 represented in FIG. 5 can comprise multiple resource blocks. Table 3 contains example resource block data identifying example channel bandwidths and example numbers of resource blocks and subcarriers that can be used or associated with each of the example channel bandwidths. Resource block data 314 can comprise the data shown in Table 3 or other data identifying channel bandwidths and a number of resource blocks and a number of subcarriers used for each channel bandwidth.

TABLE 3

| | Channel Bandwidth | | | | | |
|---|---|---|---|---|---|---|
| | 1.4 MHz | 3.0 MHz | 5.0 MHz | 10 MHz | 15 MHz | 20 MHz |
| No. of Resource Blocks | 6 | 15 | 25 | 50 | 75 | 100 |
| No. of subcarriers | 72 | 180 | 300 | 600 | 900 | 1200 |

FIG. 6 shows subcarrier mapping diagrams 602, 604, 606, and 608. Each of those diagrams illustrates an example of assigning subcarriers as at least part of the selected channel bandwidth. Twelve subcarriers A through L of resource block 502 are shown within mapping diagrams 602, 604, 606, and 608. The numbers 1, 2, and 3 within each of the twelve subcarriers A through L refer to a particular UE device. As an example, number 3 within the subcarriers can refer to UE device 102.

Subcarrier mapping diagram 602 depicts a distributed mode of assigning subcarriers A through L to UE devices 1, 2, and 3. Subcarrier mapping diagram 604 depicts a localized mode of assigning subcarriers A through L to UE devices 1, 2, and 3. Subcarrier mapping diagram 606 depicts another localized mode of assigning subcarriers A through L to UE devices 1, 2, and 3. Subcarrier mapping diagram 608 depicts all subcarriers A through L of resource block 502 being assigned to single UE device number 3.

Subcarrier mapping diagrams 602 and 604 illustrate that a number of UE devices can be assigned an identical quantify of subcarriers for multiple UE devices. Subcarrier mapping diagram 606 illustrates that different quantities of subcarriers of a resource block can be assigned to multiple UE devices. Subcarrier mapping diagram 608 illustrates that all subcarriers of a resource block can be assigned to a single UE device. A person having ordinary skill in the art will understand that the subcarriers and resource elements of the other resource blocks of channel bandwidth 506 can be assigned to one or more UE devices as shown in one or more of mapping diagram 602, 604, 606, or 608, or in another manner.

Although FIG. 5 and FIG. 6 depict particular details with respect to certain example embodiments assigning channel bandwidths to a UE device, a person having ordinary skill in the art will understand that assigning the channel bandwidths can be carried out in a manner other than the manner shown in FIG. 5 and FIG. 6.

V. Additional Features

A variety of example devices and computer-readable program instructions have been described to implement the example embodiments. Those devices or computer-readable program instructions can be configured to carry the following features.

1. Processor 302 can determine that a UE device was assigned a channel bandwidth for the communication session narrower than the widest channel bandwidth the UE device can handle and determine that other resources that were in use or otherwise not assignable as part of the channel bandwidth assigned to the UE device are presently available. After or in response to making those determinations, processor 302 can cause assigning additional resources to UE device to allow the UE device to continue the communication session using a channel bandwidth wider than originally assigned to the UE device for the communication session. Alternatively, processor 302 can assign a different and wider channel bandwidth to the UE device for continuing the communication session.

2. Processor 302 can determine that a UE device requesting to carry out a new communication session using a RAN and cause another UE device currently using the RAN to begin using a narrower channel bandwidth and reallocate a portion of the channel bandwidth previously used by the other UE device for its current communication session as a portion of a channel bandwidth of the UE device requesting to carry out the new communication session.

VI. Conclusion

Example embodiments have been described above. Those skilled in the art will understand that changes and modifications can be made to the described embodiments without departing from the true scope and spirit of the present invention, which is defined by the claims.

We claim:
1. A method comprising:
receiving, by a radio access network (RAN) controller programmed to assign radio frequency band resources of a radio access node to wireless user equipment (UE) devices, a request to use the RAN to carry out a wireless communication session between a first wireless UE device and at least one other device, wherein the radio frequency band resources of the radio access node include multiple radio frequency bands, and wherein each radio frequency band of the multiple radio frequency bands includes multiple channels with different bandwidths;
identifying, by the RAN controller after receiving the request to use the RAN to carry out the wireless communication session between the first wireless UE device and at least one other device but prior to the RAN controller assigning a selected bandwidth of a wireless channel of a selected radio frequency band to the first wireless UE device for carrying out the communication session, the first wireless UE device is a same type of wireless UE device as a plurality of wireless UE devices;
determining, by the RAN controller, an average data-usage tendency at a per wireless UE device level of the plurality of wireless UE devices identified as being the same type of wireless UE device as the first wireless UE device;
selecting, by the RAN controller in response to receiving the request to use the RAN and based on the determined average data-usage tendency at the per wireless UE device level of the plurality of wireless UE devices, both the selected radio frequency band from among the multiple radio frequency bands of the radio frequency band resources of the radio access node, and the selected bandwidth of the wireless channel within the selected radio frequency band, for assigning to the first wireless UE device; and
assigning, by the RAN controller to the first wireless UE device for carrying out the communication session, the selected bandwidth of the wireless channel of the selected radio frequency band.

2. The method of claim 1, wherein the first wireless UE device comprises a mobile telephone, a tablet device, or an air-card.

3. The method of claim 1,
wherein selecting the bandwidth of the wireless channel, in response to receiving the request to use the RAN and based on the determined average data-usage tendency at the per wireless UE device level of the plurality of wireless UE devices, comprises selecting the bandwidth of the wireless channel from a first band class while the first wireless UE device is using a wireless channel of a second band class different than the first band class.

4. The method of claim 1,
wherein selecting the bandwidth of the wireless channel, in response to receiving the request to use the RAN and based on the determined average data-usage tendency at the per wireless UE device level of the plurality of wireless UE devices, comprises selecting a first bandwidth of the wireless channel from among two or more bandwidths of the wireless channel of a band class while the UE device is using a second wireless channel of the two or more bandwidths of the wireless channel of the band class.

5. The method of claim 1,
wherein determining the average data-usage tendency at the per wireless UE device level of the plurality of wireless UE devices comprises determining whether the wireless communication session is a voice communication session, a data communication session, or a simultaneous voice and data communication session.

6. The method of claim 1,
wherein the determined average data-usage tendency at the per wireless UE device level of the plurality of UE devices is based on data-usage tendencies previously determined for the plurality of UE devices which does not include the first wireless UE device.

7. The method of claim 1,
wherein the determined average data-usage tendency at the per wireless UE device level of the plurality of UE devices is based on data-usage tendencies previously determined for the plurality of UE devices which includes the first wireless UE device.

8. The method of claim 1,
wherein selecting the bandwidth of the wireless channel is further based on a load-condition of the selected bandwidth of the wireless channel and a load-condition of one or more other bandwidths of the wireless channel assignable to the first wireless UE device.

9. The method of claim 1,
wherein selecting the radio frequency band and the bandwidth of the wireless channel, in response to receiving the request to use the RAN and based on the determined average data-usage tendency at the per wireless UE device level of the plurality of wireless UE devices, includes determining that at least one wider channel bandwidth selectable for the first wireless UE device is operating with a load condition exceeding a first threshold load condition, and
wherein the selected bandwidth of the wireless channel is not as wide as the at least one wider channel bandwidth and is operating with a load condition that does not exceed a second threshold load condition.

10. The method of claim 1,
wherein selecting the radio frequency band and the bandwidth of the wireless channel is further based on a service plan associated with the first wireless UE device, and
wherein the service plan associated with the first wireless UE device is one of a plurality of service plans associated with the RAN.

11. The method of claim 1, further comprising:
assigning, using the RAN controller, resources blocks forming the selected bandwidth of the wireless channel to the first wireless UE device for carrying out the communication session.

12. The method of claim 1, wherein determining the average data-usage tendency at the per wireless UE device level of the plurality of wireless UE devices includes determining an average data-usage rate of the first wireless UE device.

13. The method of claim 1,
wherein determining the average data-usage tendency at the per wireless UE device level of the plurality of wireless UE devices includes determining a data usage rating selected from a plurality of data usage ratings, and
wherein the determined usage rating is selected from among the group comprising a high data usage rating, a medium data usage rating, a low data usage rating, and a very low data usage rating.

14. The method of claim 1, further comprising:
receiving, at the RAN controller from the first wireless UE device, data that indicates a data-usage tendency of the first wireless UE device,
wherein the RAN controller determines the data-usage tendency of the first wireless UE device from the received data that indicates the data-usage tendency of the first wireless UE device.

15. A radio access network (RAN) control system for assigning radio frequency band resources of a radio access node to wireless user equipment (UE) devices, wherein the radio frequency band resources of the radio access node include multiple radio frequency bands, and wherein each radio frequency band of the multiple radio frequency bands includes multiple channels with different bandwidths, the system comprising:
a non-transitory computer-readable data storage device; and
a processor configured to receive a request to use the RAN to carry out a communication session between a first wireless UE device and at least one other device, and configured to execute computer-readable program instructions stored at the computer-readable data storage device,
wherein the computer-readable program instructions comprise:
(i) program instructions executable to identify, after receiving the request to use the RAN to carry out the wireless communication session between the first wireless UE device and at least one other device but prior to the processor assigning a selected bandwidth of a wireless channel of a selected radio frequency band to the first wireless UE device for carrying out the communication session, the first wireless UE device is a same type of wireless UE device as a plurality of wireless UE devices,
(ii) program instructions executable to determine an average data-usage tendency at a per wireless UE device level of the plurality of wireless UE devices identified as being the same type of wireless UE device as the first wireless UE device, (iii) program instructions executable to select, in response to receiving the request to use the RAN and based on the determined average data-usage tendency at the per wireless UE device level of the plurality of wireless UE devices, both the selected radio frequency band from among the multiple radio frequency bands of the radio frequency band resources of the radio access node, and the selected bandwidth of the wireless channel within the selected radio frequency band, for assigning to the first wireless UE device, and (iv) program instructions executable to assign, to the first wireless UE device for carrying out the communication session, the selected bandwidth of the wireless channel of the selected radio frequency band.

16. The system of claim 15, further comprising:
a communication device configured to receive the request to use the RAN and to provide the processor with the received request to use the RAN.

17. The system of claim 16, wherein the computer-readable program instructions comprise program instructions executable to cause the communication device to transmit, for reception by the first wireless UE device, a notification indicating the selected radio frequency band and the bandwidth of the wireless channel assigned to the first wireless UE device for carrying out the communication session.

18. The system of claim 16, wherein the communication device is configured to communicate with user equipment (UE) devices using one or more bandwidths of a wireless channel within two or more band classes.

19. The system of claim 15,
wherein the computer-readable data storage device comprises data representing the selected radio frequency band and the bandwidth of the wireless channel, and data representing the determined average data-usage tendency at the per wireless UE device level of the plurality of wireless UE devices, and
wherein the data representing the selected radio frequency band and the bandwidth of the wireless channel is associated with the data representing the determined average data-usage tendency at the per wireless UE device level of the plurality of wireless UE devices.

20. A non-transitory computer-readable data storage device comprising program instructions executable by a processor of a radio access network (RAN) controller that assigns radio frequency band resources of a radio access node to wireless user equipment (UE) devices, wherein execution of the program instructions cause performance of the following operations:
receiving, by the processor, a request to use the RAN to carry out a wireless communication session between a first wireless UE device and at least one other device, wherein the radio frequency band resources of the radio access node include multiple radio frequency bands, and wherein each radio frequency band of the multiple radio frequency bands includes multiple channels with different bandwidths;

identifying, by the processor after receiving the request to use the RAN to carry out the wireless communication session between the first wireless UE device and at least one other device but prior to the processor assigning a selected bandwidth of a wireless channel of a selected radio frequency band to the first wireless UE device for carrying out the communication session, the first wireless UE device is a same type of wireless UE device as a plurality of wireless UE devices;

determining, by the processor, an average data-usage tendency at a per wireless UE device level of the plurality of wireless UE devices identified as being the same type of wireless UE device as the first wireless UE device;

selecting, by the processor, in response to receiving the request to use the RAN and based on the determined average data-usage tendency at the per wireless UE device level of the plurality of wireless UE devices, both the selected radio frequency band from among the multiple radio frequency bands of the radio frequency band resources of the radio access node, and the selected bandwidth of the wireless channel within the selected radio frequency band, for assigning to the first wireless UE device; and assigning, by the processor, to the first wireless UE device for carrying out the communication session, the selected bandwidth of the wireless channel of the selected radio frequency band.

21. The non-transitory computer-readable data storage device of claim 20,
wherein the non-transitory computer-readable data storage device comprises data representing the selected bandwidth of the wireless channel and data representing the determined average data-usage tendency at the per wireless UE device level of the plurality of wireless UE devices, and
wherein the operations further comprise referring to the data representing the selected bandwidth of the wireless channel and the data representing the determined average data-usage tendency at the per wireless UE device level of the plurality of wireless UE devices to select the bandwidth of the wireless channel.

22. The non-transitory computer-readable data storage device of claim 20, wherein the operations further comprise causing a communication device to transmit, for reception by the first wireless UE device, a notification indicating the selected bandwidth of the wireless channel assigned to the first wireless UE device for carrying out the communication session.

* * * * *